United States Patent
Park

(10) Patent No.: US 9,740,475 B2
(45) Date of Patent: Aug. 22, 2017

(54) IMAGE FORMING APPARATUS, MANAGEMENT SYSTEM FOR MANAGING THE IMAGE FORMING APPARATUS, AND INFORMATION PROVIDING METHOD OF THE IMAGE FORMING APPARTUS

(71) Applicant: SAMSUNG ELECTRONICS CO., LTD., Suwon-si, Gyeonggi-do (KR)

(72) Inventor: Sang-woo Park, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 147 days.

(21) Appl. No.: 14/947,446

(22) Filed: Nov. 20, 2015

(65) Prior Publication Data
US 2016/0077825 A1 Mar. 17, 2016

Related U.S. Application Data

(63) Continuation of application No. 13/655,079, filed on Oct. 18, 2012, now abandoned.

(30) Foreign Application Priority Data

Oct. 20, 2011 (KR) .................. 10-2011-0107617
Aug. 9, 2012 (KR) .................. 10-2012-0087395

(51) Int. Cl.
*G06F 15/173* (2006.01)
*G06F 9/445* (2006.01)
(Continued)

(52) U.S. Cl.
CPC ................ *G06F 8/65* (2013.01); *G06F 8/61* (2013.01); *G06F 9/44505* (2013.01); *H04L 67/34* (2013.01); *H04N 1/00233* (2013.01); *H04N 1/00938* (2013.01); *H04N 2201/0081* (2013.01); *H04N 2201/0082* (2013.01); (Continued)

(58) Field of Classification Search
CPC ................ G06F 7/78; G06F 8/00–8/78; G06F 9/44–9/455; G06F 11/36
See application file for complete search history.

(56) References Cited

U.S. PATENT DOCUMENTS 5,778,183 A 7/1998 Filion et al.
6,119,156 A 9/2000 Filion et al.
(Continued)

OTHER PUBLICATIONS

Zapf et al., Decentralized SNMP Management with Mobile Agents, 1999.*
(Continued)

*Primary Examiner* — H S Sough
*Assistant Examiner* — Zhan Chen
(74) *Attorney, Agent, or Firm* — Staas & Halsey LLP

(57) ABSTRACT

An image forming apparatus is provided. The image forming apparatus includes a network interface unit which is connected to a host device in which a manager program is stored, a printing unit which performs a printing job, a storage unit which stores a management information base (MIB), and an agent program, and a control unit which communicates with the host device using a Simple Network Management Protocol (SNMP). If an application is newly installed, the control unit updates the MIB. Therefore, it is possible to easily add, modify, or delete a management object (MO).

21 Claims, 14 Drawing Sheets

(51) Int. Cl.
*H04N 1/00* (2006.01)
*H04L 29/08* (2006.01)

(52) U.S. Cl.
CPC ............... *H04N 2201/0091* (2013.01); *H04N 2201/0093* (2013.01); *H04N 2201/0094* (2013.01)

(56) References Cited

U.S. PATENT DOCUMENTS

| | | | |
|---|---|---|---|
| 6,434,744 | B1 | 8/2002 | Chamberlain et al. |
| 6,754,895 | B1 | 6/2004 | Bartel et al. |
| 7,584,466 | B1 | 9/2009 | Rao |
| 2001/0052006 | A1 | 12/2001 | Barker et al. |
| 2002/0002608 | A1 | 1/2002 | Aspromonte et al. |
| 2002/0188719 | A1* | 12/2002 | Pham ............ H04L 41/0213 709/224 |
| 2003/0140081 | A1 | 7/2003 | De Bonet et al. |
| 2004/0031030 | A1 | 2/2004 | Kidder et al. |
| 2005/0198249 | A1* | 9/2005 | Hwang ............ H04L 41/0213 709/223 |
| 2006/0101138 | A1 | 5/2006 | Son |
| 2007/0156711 | A1 | 7/2007 | Yuengling et al. |
| 2007/0234354 | A1 | 10/2007 | Hattori |
| 2008/0220848 | A1 | 9/2008 | Adiraju et al. |
| 2008/0263511 | A1 | 10/2008 | Shapiro |
| 2009/0006453 | A1 | 1/2009 | Liu et al. |
| 2010/0057897 | A1 | 3/2010 | Lee et al. |
| 2010/0191951 | A1 | 7/2010 | Malone et al. |
| 2011/0258688 | A1* | 10/2011 | Peterson ............ G06F 9/542 726/7 |
| 2011/0276695 | A1 | 11/2011 | Maldaner |

OTHER PUBLICATIONS

U.S. Office Action issued Feb. 26, 2014 in copending U.S. Appl. No. 13/655,079.
U.S. Office Action issued Jun. 23, 2014 in copending U.S. Appl. No. 13/655,079.
U.S. Office Action issued Oct. 23, 2014 in copending U.S. Appl. No. 13/655,079.
U.S. Office Action issued Feb. 27, 2015 in copending U.S. Appl. No. 13/655,079.
U.S. Office Action issued Aug. 20, 2015 in copending U.S. Appl. No. 13/655,079.
U.S. Appl. No. 13/655,079, filed Oct. 18, 2012, Sang-woo Park, Samsung Electronics Co., Ltd.

* cited by examiner

| Version | Community | SNMP PDU |
|---|---|---|

(b)

| PDU type | Request-id | 0 | 0 | Variablebindings |
|---|---|---|---|---|

(c)

| PDU type | Request-id | Error status | Error index | Variablebindings |
|---|---|---|---|---|

(d)

| PDU type | enterprise | Agent addr | Generic-trap | Specific-trap | Time stamp | Variablebindings |
|---|---|---|---|---|---|---|

(e)

| name 1 | Value 1 | name1 | Value 2 | .... | name n | Valuen |
|---|---|---|---|---|---|---|

FIG. 14

| MIB Node Properties-prtMarkerSuppliesLevel | |
|---|---|
| ☐ ☑ Smart update ☑ Bring to front | |
| Module: Printer-MIB | |
| Name: | prtMarkerSuppliesLevel |
| Type: | OBJECT-TYPE |
| Full path: | iso(1).org(3).dod(6).internet(1).mgmt(2).mib-2(1).printmib(43). prtMarkerSupplies(11).petMarke |
| Module: | Printer-MIB |
| Parent: | prtMarkerSuppliesEntry |
| Prev sibling: | PrtMarkerSuppliesMaxCapacity |
| Numerical syntax: | Integer(32bit) |
| Base syntax: | Integer32 |
| Composed syntax: | Integer32 |
| Status: | current |
| Max access: | read-write |
| Size List: | 1:-3..2147483647 |
| Description: | The current level if this supply is a container; the remaining space of this supply is a receptacle. If this supply container/receptacle can reliably sense this value, the value is reported by the printer and is read-only; otherwise, the value may be written (by a remote Control Panel or a Management Application). The value (-1) means other and specifically indicates that the sub-unit places no restrictions on this parameter. The value (-2) means unknown. A value of (-3) means that the printer knows that there is some supply/ remaining space, respectively. |

IMAGE FORMING APPARATUS, MANAGEMENT SYSTEM FOR MANAGING THE IMAGE FORMING APPARATUS, AND INFORMATION PROVIDING METHOD OF THE IMAGE FORMING APPARTUS

CROSS-REFERENCE TO RELATED APPLICATIONS

This application is a continuation of U.S. application Ser. No. 13/655,079 filed Oct. 18, 2012, which claims priority benefit under 35 U.S.C. §119 from Korean Patent Application Nos. 10-2011-0107617 and 10-2012-0087395, filed on Oct. 20, 2011 and Aug. 9, 2012, respectively, in the Korean Intellectual Property Office, the disclosures of which are incorporated herein by reference in their entirety.

BACKGROUND

1. Field

Embodiments relate to an image forming apparatus, a management system for managing the image forming apparatus, and an information providing method of the image forming apparatus, and more particularly, to an image forming apparatus capable of updating one or more managed objects (MOs) by installing a new application, a management system for managing the image forming apparatus, and information providing method of the image forming apparatus.

2. Description of the Related Art

Due to recent developments in electronic technology, various types of electronic devices have been developed and commercialized. In particular, various image forming apparatuses, such as printers, scanners, facsimile machines, copiers, and multifunctional peripheral (MFP) devices, have been widely used in homes and offices.

In an environment equipped with multiple devices, the multiple devices may be connected to a network so that they can be shared by multiple users. In this example, a manager may manage each of the devices by using a manager program that is installed in his or her terminal device. For example, when the manager executes the manager program, the manager program may communicate with an agent program that is installed in each of the devices, and may thus be provided with information relating to each of the devices. The manager program may display the information provided by each of the devices on the screen of the terminal device of the manager.

The agent program may provide information to the manager program by using an embedded application that is embedded in firmware. The information provided by the agent program may be included in a managed object (MO) that is managed by the embedded application.

It is also often necessary for an operator of equipment or a maintenance/repair company for the equipment to add new MOs to or modify existing MOs in the equipment.

To meet the needs of each client, the manufacturer of the equipment may need to manufacture new software for adding new MOs or modifying existing MOs. In this manner, however, it is not only difficult but also costly to readily provide solutions for various business demands.

SUMMARY

Embodiments address at least the above problems and/or disadvantages and other disadvantages not described above. Also, embodiments are not required to overcome the disadvantages described above, and an embodiment may not overcome any of the problems described above.

Embodiments provide an image forming apparatus which can install an application that provide necessary information, a management system for managing the image forming apparatus, and an information providing method of the image forming apparatus.

According to an aspect of one or more embodiments, there is provided an image forming apparatus, including a network interface unit which is connected to a host device in which a manager program is stored, a printing unit which performs a printing job, a storage unit which stores information on the image forming apparatus, a management information base (MIB), and an agent program corresponding to the manager program, and a control unit which communicates with the host device using a Simple Network Management Protocol (SNMP)

If an application is newly installed, the control unit may update the MIB using an object identifier (OID) of a management object (MO) which the newly installed application has, and if a request for information designating an OID included in the updated MIB is input from the host device, the control unit may transmit information corresponding to the designated OID to the host device by executing an application corresponding to the designated OID using the agent program.

If the newly installed application has a new MO which existing applications do not have, the control unit may add an OID of the new MO to the MIB.

If the newly installed application has a changed MO which changes an existing MO, the control unit may change an OID of the existing MO recorded in the MIB to an OID of the changed MO.

If the newly installed application is an application to delete an existing MO, the control unit may delete an OID of the existing MO recorded in the MIB.

The storage unit may store an embedded application having at least one MO and an additional application to be installed later.

In this case, if the OID designated by the information request transmitted from the host device is an OID of the MO which the embedded application has, the control unit may provide the host device with information using the embedded application, or if the designated OID is an OID of an MO which the additional application has, the control unit may provide the host device with information using the additional application.

The image forming apparatus may further include an interface unit which is connected to an external source in which an application to newly install is stored, and a user interface (UI) unit which receives a request to install an application.

In this case, if the external source is connected to the interface unit and if the request to install the application is input, the control unit may install and store the application stored in the external source, in the storage unit.

The control unit may include an agent execution module which executes the agent program, an application registration module which verifies the application stored in the external source if the request to install the application is input, an application storage module which installs and stores the application in the storage unit if the verification is completed, and an application control module which executes the application newly installed in the storage unit and registers object information for an MO which the newly installed application has, in the agent program.

According to an aspect of one or more embodiments, there is provided a management system including a host device which stores a manager program, and an image forming apparatus which stores an agent program corresponding to the manager program.

The image forming apparatus may include a network interface unit which is connected to a host device, a printing unit which performs a printing job, a storage unit which stores information on the image forming apparatus, a first MIB, and the agent program, and a control unit which communicates with the host device using an SNMP.

If an application is newly installed, the control unit may update the first MIB using an OID of an MO which the newly installed application has, and if a request for information designating an OID included in the updated first MIB is input from the host device, the control unit may transmit information corresponding to the designated OID to the host device by executing an application corresponding to the designated OID using the agent program.

In addition, the host device may have a second MIB individually, transmit a request for information to the image forming apparatus using the second MIB, and receive the information, and if the application is newly installed in the image forming apparatus, the host device may update the second MIB using an OID of an MO which the newly installed application has.

If the application newly installed in the image forming apparatus has a new MO which existing applications do not have, the control unit may add an OID of the new MO to the first MIB, and the host device may add the OID of the new MO and the information on the image forming apparatus to the second MIB.

Alternatively, if the application newly installed in the image forming apparatus has a changed MO which changes an existing MO, the control unit may change an OID of the existing MO recorded in the first MIB to an OID of the changed MO.

Alternatively, if the application newly installed in the image forming apparatus is an application to delete an existing MO, the control unit may delete an OID of the existing MO recorded in the first MIB.

The storage unit may store an embedded application having at least one MO and an additional application to be installed later.

If the OID designated by the information request transmitted from the host device is an OID of the MO which the embedded application has, the control unit may provide the host device with information using the embedded application, or if the designated OID is an OID of an MO which the additional application has, the control unit may provide the host device with information using the additional application.

The image forming apparatus may further include an interface unit which is connected to an external source in which an application to newly install is stored, and a user interface (UI) unit which receives a request to install an application.

If the external source is connected to the image forming apparatus and if the request to install the application is input, the control unit may install and store the application stored in the external source, in the storage unit.

According to an aspect of one or more embodiments, there is provided an information providing method of an image forming apparatus, the method including if an application is newly installed, storing the application, updating an MIB using an agent program based on an OID of an MO which the application has, receiving an information request from a host device in which a manager program corresponding to the agent program is installed, using an SNMP, searching the MIB for an MO designated by the information request, and providing the host device with information corresponding to the designated MO using an application corresponding to the searched MO from among pre-installed applications.

In the updating of the MIB, if the newly installed application has a new MO which existing applications do not have, an OID of the new MO may be added to the MIB, if the newly installed application has a changed MO which changes an existing MO, an OID of the existing MO recorded in the MIB may be changed to an OID of the changed MO, and if the newly installed application is an application to delete an existing MO, an OID of the existing MO recorded in the MIB may be deleted.

According to the above-mentioned one or more embodiments, it is possible to directly install an application that provides necessary information in an image forming apparatus. Therefore, it is possible to easily add information to and delete information from an image forming apparatus. In addition, it is also possible to easily modify information in the image forming apparatus.

BRIEF DESCRIPTION OF THE DRAWINGS

These and/or other aspects will be more apparent by describing embodiments with reference to the accompanying drawings, in which:

FIG. 12, parts (a)-(e) are views illustrating a format of an SNMP message;

FIGS. 13 and 14 are views illustrating a management information base; and

DETAILED DESCRIPTION

Figure 1:
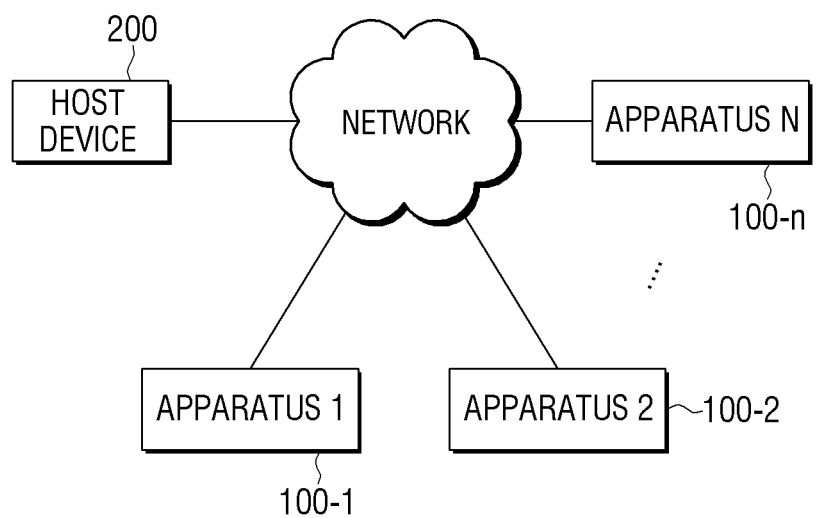
FIG. 1 is a block diagram illustrating a management system according to an embodiment.

Reference will now be made in detail to embodiments, examples of which are illustrated in the accompanying drawings, wherein like reference numerals refer to the like elements throughout. Embodiments are described below to explain the disclosure by referring to the figures.

In the following description, the same drawing reference numerals are used for the same elements even in different drawings. The matters defined in the description, such as detailed construction and elements, are provided to assist in a comprehensive understanding of embodiments. Thus, it is apparent that embodiments can be carried out without those specifically defined matters. Also, well-known functions or constructions are not described in detail since they would obscure embodiments with unnecessary detail.

FIG. 1 is a block diagram illustrating a management system according to an embodiment. Referring to FIG. 1, the management system includes a plurality of apparatuses 100-1, 100-2, . . . , and 100-n and a host device 200. The apparatuses 100-1, 100-2, . . . , and 100-n and the host device 200 may be connected to one another via a network. The apparatuses 100-1, 100-2, . . . , and 100-n may be implemented as various types of devices. For example, the apparatuses 100-1, 100-2, . . . , and 100-n may be implemented as various types of image forming devices such as a printer, a scanner, a facsimile machine, a copier, a multifunctional peripheral (MFP) device, and the like. For example, the host device 200 may be implemented as a personal computer (PC).

The host device 200 may manage each of the apparatuses 100-1, 100-2, . . . , and 100-n by using a Simple Network Management Protocol (SNMP), which is a application layer standard protocol defined based on User Datagram Protocol (UDP) for managing and monitoring multiple devices on the network. The SNMP may be used by general operating systems (OS), network equipments such as routers, switches and server, image forming apparatuses, etc.

The SNMP defines the communication between a manager program that is installed in the host device 200 and an agent program installed in each of the apparatuses 100-1, 100-2, . . . , and 100-n. The manager program and the agent program may also be referred to as an SNMP manager and an SNMP agent. Each agent program may collect and store information relating to the corresponding apparatus. The manager program may collect information relating to each agent program from the network and may manage the network.

The host device 200 may execute the manager program, and may thus transmit a request message to each of the apparatuses 100-1, 100-2, . . . , and 100-n. The apparatuses 100-1, 100-2, . . . , and 100-n may execute their agent programs, and each of the agent programs of the apparatuses 100-1, 100-2, . . . , and 100-n may transmit a response message including information relating to the corresponding apparatus to the host device 200. The host device 200 may periodically monitor the remaining amount of expendable supplies of each image forming apparatus remotely using the manager program or may directly change diverse setting values of each image forming apparatuses. A communication process between the host device and each image forming apparatus using the SNMP will be explained in greater detail below.

A set of standards that describe the types of information that need to be collected by each agent program may be referred to as a Management Information Base (MIB).

The MIB, which is a management schema for the SNMP, defines one or more managed objects (MOs) that are managed by the SNMP. The MIB is as defined by the International Telecommunication Union-Telecommunication Standardization Sector (ITU-T). The MOs may include, but are not limited to, network resources that are managed, that is, data variables. The MOs may be a piece of information provided from a managed device using the SNMP. For example, the MOs may include various information relating to an image forming apparatus such as the state of the device, settings of the device, the amount of expendable supplies used, a page count, a dot count, the remaining amount of expendable supplies, the amount of paper, charging information, and the like. The MO may also be referred to as an MIB object or an object.

The MOs may be defined by the Abstract Syntax Notation One (ASN.1) grammar. Each of the MOs may have a name, grammar, and an encoding rule for being transmitted to another system. The MOs may be identified by their unique identification information, i.e., object identifiers (OIDs). The MIB will be explained in greater detail below.

In response to the receipt of a request for particular information from the manager program of the host device 200, each of the agent programs of the apparatuses 100-1, 100-2, . . . , and 100-n may search for an OID of an MO corresponding to the particular information from the MIB, and may transmit information relating to the searched MO to the host device 200.

An application for managing the MOs may be installed in each of the apparatuses 100-1, 100-2, . . . , and 100-n. The application may be implemented as an embedded application embedded in the firmware of each of the apparatuses 100-1, 100-2, . . . , and 100-n. The embedded application may provide information relating to the MOs that are managed by the embedded application to the agent programs of the apparatuses 100-1, 100-2, . . . , and 100-n, and may thus allow the apparatuses 100-1, 100-2, . . . , and 100-n to transmit the information relating to the MOs to the host device 200 upon the request of the host device 200.

Referring to FIG. 1, the apparatuses 100-1, 100-2, . . . , and 100-n may be configured to install not only the embedded application but also a new application therein. For example, a manager may install an application for adding a new MO, which is different from the existing MOs managed by the embedded application, an application for modifying at least one of the existing MOs, or an application for deleting at least one of the existing MOs in any one of the apparatuses 100-1, 100-2, . . . , and 100-n.

In response to the installation of a new application for adding a new MO or modifying or deleting an existing MO in one of the apparatuses 100-1, 100-2, . . . , and 100-n, the apparatus where the new application is installed may register a new MO with the MIB, or may modify or delete the OID of an existing MO present in the MIB, and the agent program of the corresponding apparatus may respond to a request from the manager program of the host device 200 based on the updated MIB.

That is, in response to the receipt of a request for information relating to a new MO, the agent program may transfer the received request to a new application that has registered the new MO, and the new application may provide the information relating to the new MO to the agent program. The information relating to the new MO may be transmitted to the host device 200. Alternatively, if an existing MO is modified and a request for information relating to the modified existing MO is received, the information relating to the modified MO may be identified by using a new application, instead of using the embedded application, and may be transmitted to the host device 200. Alternatively, if an existing MO is deleted and a request for information relating to the deleted existing MO is received, a message indicating that the information relating to the existing MO cannot be provided may be transmitted to the host device 200.

In general, information on the image forming apparatus is used when the host PC or the server operates diverse solutions using the image forming apparatus. A third party or a maintenance/repair company which manages a printer may need implementation of an additional MO for operating solutions or modification of an OID provided by the printer. In the past, if there was a need for an additional MO or modification of an OID, the third party or the maintenance/repair company requested new device software added with a corresponding function from the vendor of the printer, which caused difficulty in providing prompt solutions.

However, the management system illustrated in FIG. 1 may configure an application for providing information requested by a third party or a maintenance/repair company and install the application in the apparatuses 100-1, 100-2, . . . , and **100-*n***. Therefore, it is possible to provide solutions for various business demands. For example, in the case of information on expendable supplies in the MIB of the printer, let's suppose that there is a third party which manages image forming apparatuses using the SNMP, and that the third party provides information on a consumed amount of expendable supply only for toner. If the third part wishes to manage an consumed amount of an imaging unit, which has not been provided by the printer, other than the information on the consumed amount of toner, the third party may use the information on a consumed amount of the imaging unit by installing an SNMP application implementing an MO providing the information on the consumed amount of the imaging unit without help of a vendor.

Figure 2:
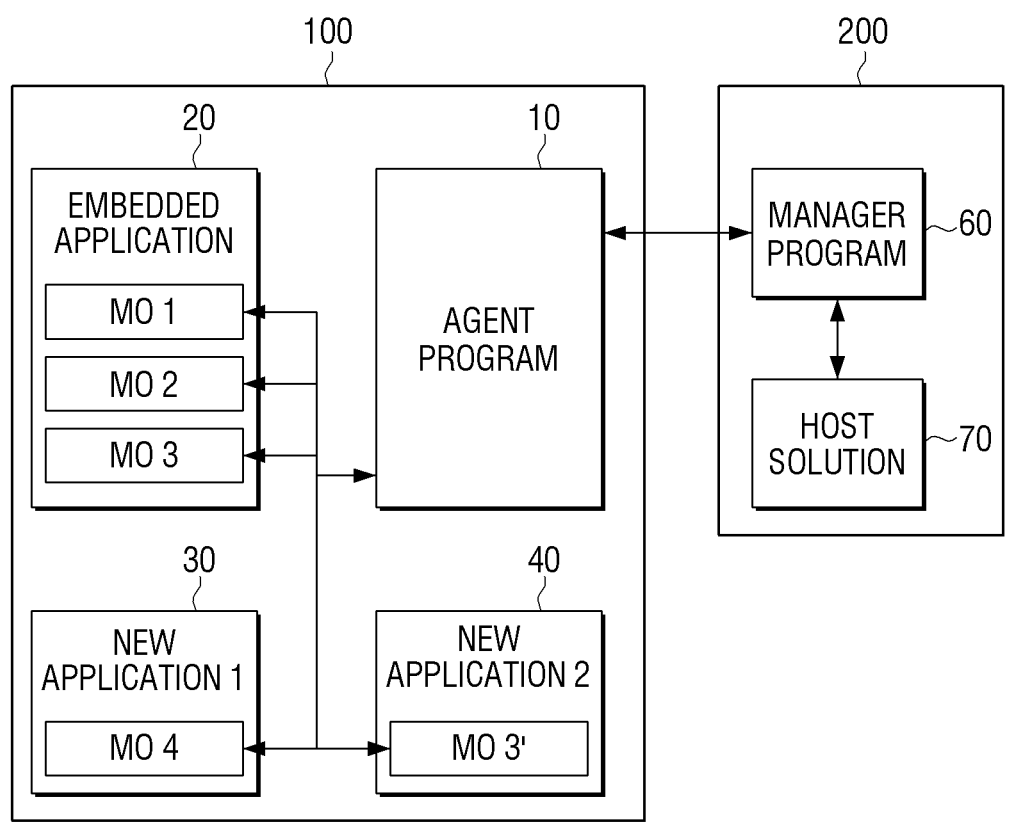
FIG. 2 is a block diagram illustrating an image forming apparatus according to an embodiment.

FIG. 2 is a block diagram illustrating an operation between an apparatus 100 and the host device 200, according to an embodiment. Referring to FIG. 2, an agent program 10, an embedded application 20, and application 1 (30) and application 2 (40) are installed in the apparatus 100, and a manager program 60 and a host solution 70 are installed in the host device 200.

The embedded application 20 may be embedded in the firmware of the apparatus 100, and may manage MOs 1, 2, and 3.

Application 1 (30) may be a new application for adding new MO 4. Application 2 (40) may be a new application for modifying MO 3. In response to the installation of application 1 (30) by a manager, application 1 (30) may notify the agent program 10 of the presence of MO 4 in application 1 (30) by registering MO 4 with the agent program 10. If an SNMP request with an OID of MO 4 is received from the manager program 60 of the host device 200, the agent program 10 may transmit the received SNMP request to application 1 (30), may receive information from application 1 (30) based on the received SNMP request, and may transmit the received information to the host device 200.

In response to the installation of application 2 (40), application 2 (40) may receive reference information relating to MO 3, which is already registered in the agent program 10, and may modify MO 3 based on the received reference information, thereby generating modified MO 3'. Application 2 (40) may notify the agent program 10 of the presence of modified MO 3' in application 2 (40) by registering modified MO 3' with the agent program 10. If an SNMP request with an OID corresponding to MO 3 is received from the host device 200, the agent program 10 may transmit the received SNMP request to the embedded application 20 that has registered MO 3 in the agent program 10 and application 2 (40) that has registered modified MO 3' in the agent program 10, may receive information from the embedded application 20 and application 2 (40) based on the received SNMP request, and may transmit the received information to the host device 200.

The manager program 60 of the host device 200 may detect necessary information from the information provided by the agent program 10, and may provide the detected information to the host solution 70. The host solution 70 may display the information provided by the manager program 60 on a User Interface (UI) or may use the corresponding information for a solution for managing network equipment.

Only application 1 (30) for adding an MO and application 2 (40) for modifying an MO are illustrated in FIG. 2 as being installed in the apparatus 100. In another example, a new application for deleting one of MOs 1, 2, and 3 may also be installed in the apparatus 100. This example will be described later in detail.

Figure 3:
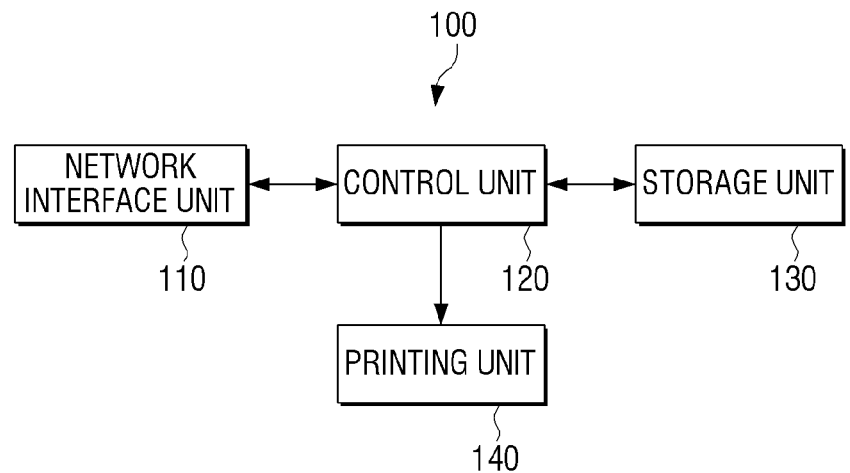
FIGS. 3 and 4 are block diagrams illustrating image forming apparatuses according to one or more embodiments.

FIG. 3 is a block diagram illustrating an example of the apparatus 100, i.e., an image forming apparatus according to an embodiment. The structure of the apparatus 100 illustrated in FIG. 3 may be applied to any one of the apparatuses 100-1, 100-2, . . . , and **100-*n* illustrated in FIG. 1 or 2. Referring to FIG. 3, the image forming apparatus 100 includes a network interface unit 110, a control unit 120, a storage unit 130, and a printing unit 140**.

The network interface unit 110 may be connected to the host device 200 in accordance with a predetermined network communication standard.

The storage unit 130 may store various data and programs. For example, the storage unit 130 may store an OS, an MIB, an agent program, an embedded application, and various other applications.

The printing unit 140 is an element to perform a printing job.

In a case in which the image forming apparatus 100 is a laser printer, the printing unit 140 may include various units such as, for example, a photosensitive element, a charge unit, an exposure unit, a developer unit, a transfer unit, a fusing unit and the like. The printing unit 140 performs an image forming job using these units. Specifically, paper is fed from a paper feeder, the surface of a photoconductive object is charged, and light exposure, developing, transferring, and fusing are performed in order, so that an image is printed on paper. If the image forming apparatus 100 has a scanning function, the image forming apparatus 100 may further include a scanning unit (not illustrated), but illustration and description thereof are omitted here. However, paper is only one type of print medium and other types of print media may be substituted for paper.

The control unit 120 generally manages the operation of the image forming apparatus 100. Specifically, in response to the receipt of a print command, the control unit 120 controls the printing unit 140 to perform an image forming job. The control unit 120 may store various information such as, for example, the amount of expendable supplies consumed in the course of the image forming job, the remaining amount of expendable supplies, the number of pages printed, a dot count, the duration of the use of the image forming apparatus 100 for the image forming job, information on a user of the image forming apparatus 100, and the like, in the storage unit 130.

The control unit 120 may execute the embedded application or the agent program present in the storage unit 130, and may thus control the information stored in the storage unit 130 to be transmitted to the host device 200 upon the request of the host device 200.

In response to the installation of a new application in the image forming apparatus 100, the control unit 120 may store the new application in the storage unit 130, and may update the MIB present in the storage unit 130 with information relating to an MO of the new application.

In response to the receipt of a request for information from the host device 200, the control unit 120 may acquire the requested information by using the embedded application or the new application, and may transmit the acquired information to the host device 200 via the network interface unit 110.

For example, in response to the installation of a new application for modifying an existing MO of the embedded application, the control unit 120 may update information relating to the existing MO with information relating to a modified MO that is obtained by modifying the existing MO, and may store the information relating to the modified MO in the storage unit 130. In this example, in response to the receipt of a request for the information relating to the existing MO from the host device 200, the control unit 120 may provide the information relating to the modified MO to the host device 200 by using the new application. Alternatively, in response to the installation of a new application for deleting an existing MO of the embedded application, the control unit 120 may execute the new application, and may thus delete the existing MO from the storage unit 130.

Figure 4:
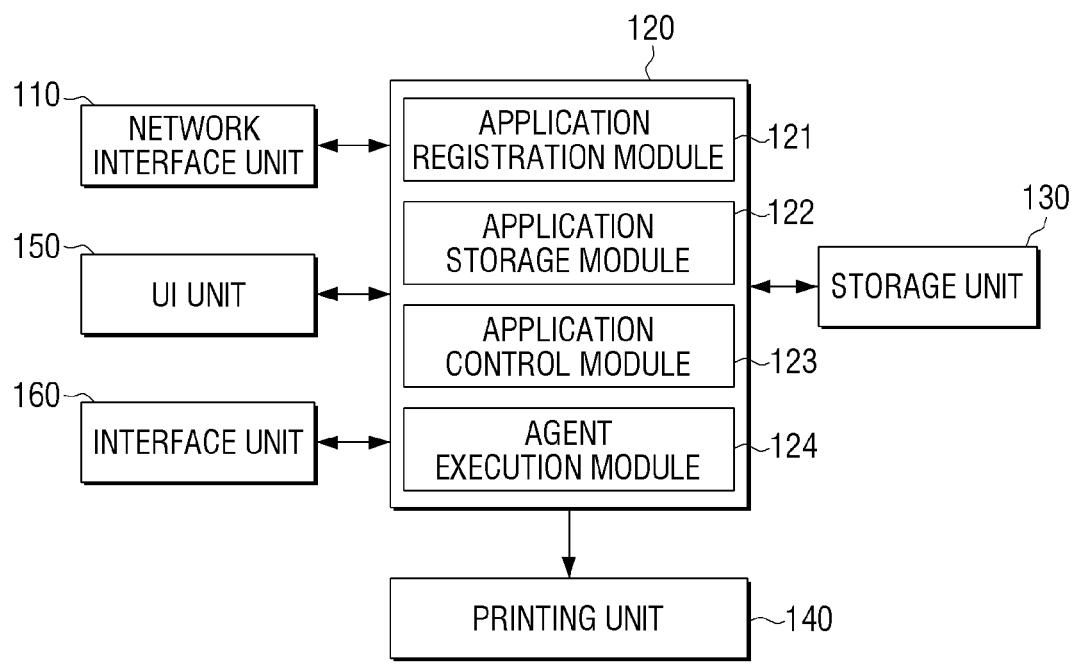

FIG. 4 is a detailed block diagram illustrating an example of the image forming apparatus 100, according to an embodiment. Referring to FIG. 4, the image forming apparatus 100 includes the network interface unit 110, the control unit 120, the storage unit 130, the printing unit 140, a UI unit 150, and an interface unit 160.

The network interface unit 110 may communicate with the host device 200 by using the SNMP.

The storage unit 130 may store various data and programs for operating the image forming apparatus 100.

The printing unit 140 is an element to perform an image forming job as described above.

The UI unit 150 may receive various user commands. For example, the UI unit 150 may be implemented as a touch screen, and may provide various UI windows for a user.

The interface unit 160 is an element to be connected to diverse external sources such as universal serial bus (USB) memory sticks, memory cards, other storage media, and diverse terminal devices. The interface unit 160 may include a plurality of connection ports.

The user may install a new application in the image forming apparatus 100 using the interface unit 160 and the UI unit 150.

Specifically, the user connects the image forming apparatus 100 and an external source in which a new application is stored, through the interface unit 160, and inputs an application installation request through the UI unit 150. In response to the application installation request, the control unit 120 installs and stores the new application in storage unit 130.

Alternatively, the image forming apparatus 100 may download a new application from an external source connected thereto via a network with the aid of the network interface unit 110. In response to the provision of a new application, the user may enter a request for the installation of the new application to the image forming apparatus 100 via the UI unit 140.

The control unit 120 includes an application registration module 121, an application storage module 122, an application control module 123, and an agent execution module 124. The application registration module 121, the application storage module 122, the application control module 123, and the agent execution module 124 may perform the above-mentioned functions of the control unit 120 by executing the relevant programs in the storage unit 130. The operations of the application registration module 121, the application storage module 122, the application control module 123, and the agent execution module 124 will hereinafter be described with reference to FIG. 5.

Figure 5:
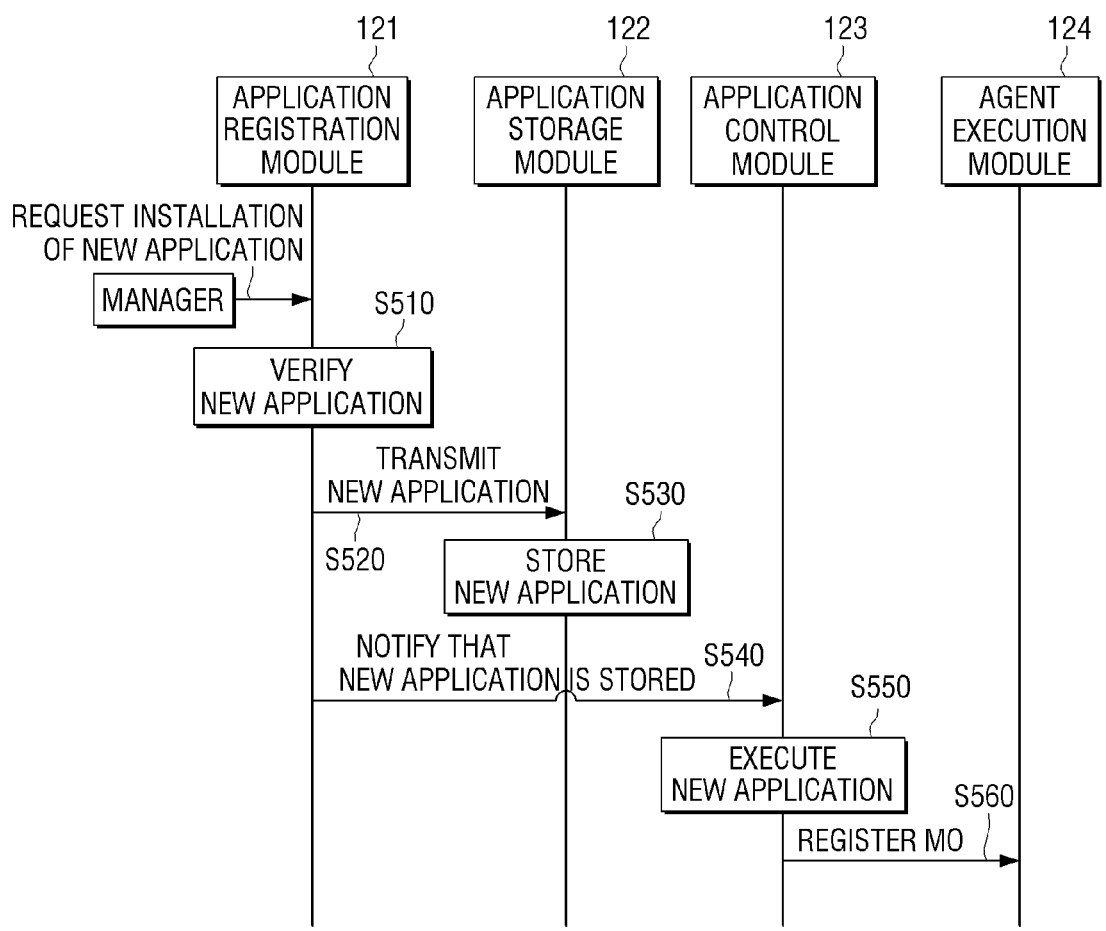
FIG. 5 is a diagram illustrating an example of an install process for installing an application in an image forming apparatus, according to an embodiment.

Referring to FIG. 5, in operation S510, in response to the receipt of a request for the installation of a new application from a manager, the application registration module 121 may verify whether the new application is operable in connection with an agent program of the image forming apparatus 100 and whether the new application includes all required functions.

In operation S520, the application registration module 121 may provide the new application to the application storage module 122 in a case in which the new application has been successfully verified.

In operation S530, the application storage module 122 may store the new application in the storage unit 130 by executing an installation file of the new application.

In operation S540, in response to the storing of the new application, the application registration module 121 may transmit information relating to the new application to the application control module 123.

In operation S550, the application control module 123 may readily execute the new application.

In operation S560, the application control module 123 may provide an MO of the new application to the agent execution module 124 and may register the MO of the new application in the agent program of the image forming apparatus 100.

The MO of the new application may be provided to the host device 200 only when the new application is being executed. Accordingly, the application control module 123 may execute the new application so that the new application continues to be activated until the user terminates the execution of the new application. For example, the application control module 123 may execute the new application whenever the image forming apparatus 100 is reset.

The agent execution module 124 may execute an agent program corresponding to the manager program of the host device 200. For example, the agent execution module 124 may execute the agent program whenever the image forming apparatus 100 is reset, so that the agent program continues to be activated.

If information relating to a new MO is provided in response to the installation of a new application having the new MO, the agent execution module 124 may add an OID of the new MO to an MIB. In response to the receipt of a request for the information relating to the new MO from the host device 200, the agent execution module 124 may search the MIB for the information relating to the new MO, acquires the information relating to the new MO by using at least one of an embedded application of the image forming apparatus 100 and the new application, and may provide the acquired information to the host device 200.

Figure 6:
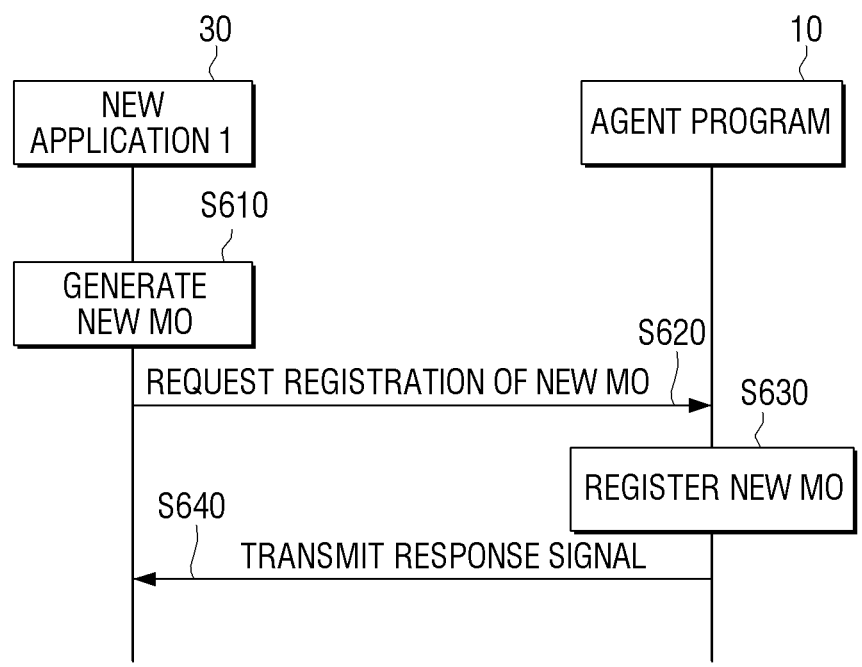
FIG. 6 is a diagram illustrating an example of a registration process for registering a managed object (MO) with an image forming apparatus, according to an embodiment.

FIG. 6 is a diagram illustrating an example of registering a new MO, according to an embodiment. Referring to FIG. 6, in operation S610, in response to the installation and execution of application 1 (30), application 1 (30) may generate a new MO. In operation S620, application 1 (30) may transmit information relating to the new MO, including an OID of the new MO, to the agent program 10, and may request the agent program 10 to register the new MO.

In operation S630, the agent program 10 may register the new MO in an MIB by adding the OID of the new MO to the MIB. In operation S640, the agent program 10 may transmit a response signal indicating whether the new MO has been successfully registered to application 1 (30).

Figure 7:
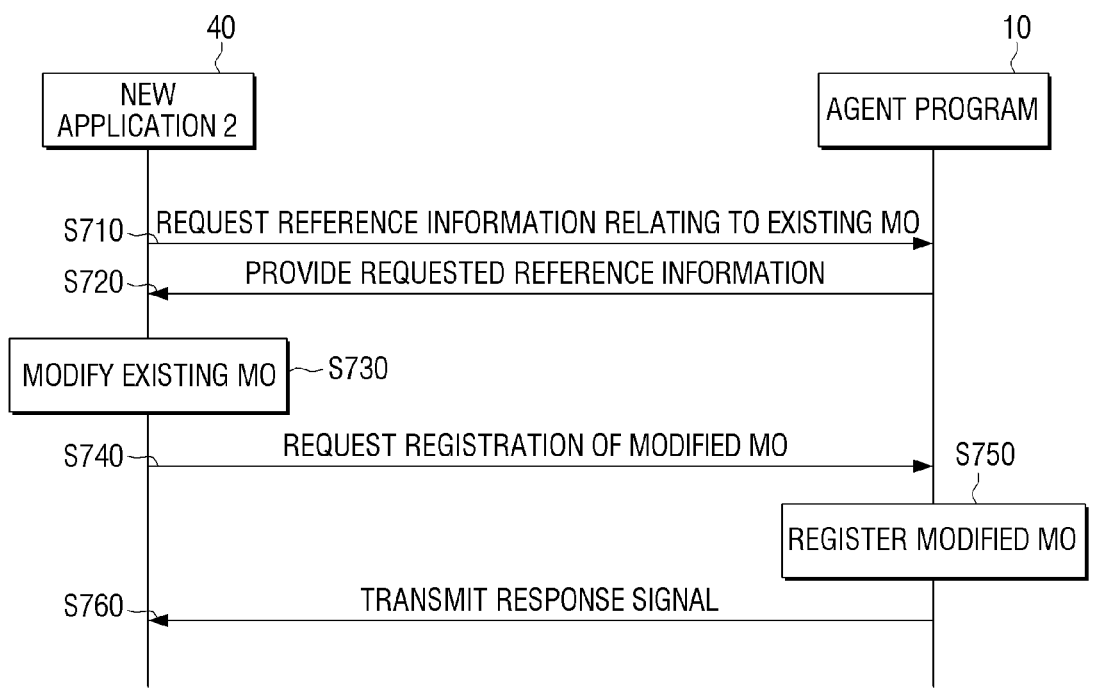
FIG. 7 is a diagram illustrating an example of a modification process for modifying an MO in an image forming apparatus, according to an embodiment.

FIG. 7 is a diagram illustrating an example of modifying an existing MO, according to an embodiment. Referring to FIG. 7, in operation S710, in response to the installation and execution of application 1 (30), application 2 (40) may request reference information relating to an existing MO from the agent program 10. The reference information may include an OID of the existing MO and information indicating the properties of the existing MO. In operation S720, the agent program 10 may provide the reference information to application 2 (40).

In operation S730, application 2 (40) may modify the existing MO based on the reference information, thereby generating a modified MO. In operation S740, application 2 (40) may provide information relating to the modified MO to the agent program 10, and may request the agent program 10 to register the modified MO.

In operation S750, the agent program 10 may register the modified MO by updating the OID of the original existing MO with the OID of the modified MO. In operation S760, the agent program 10 may transmit a response signal indicating whether the modified MO has been successfully registered to application 2 (40).

Figure 8:
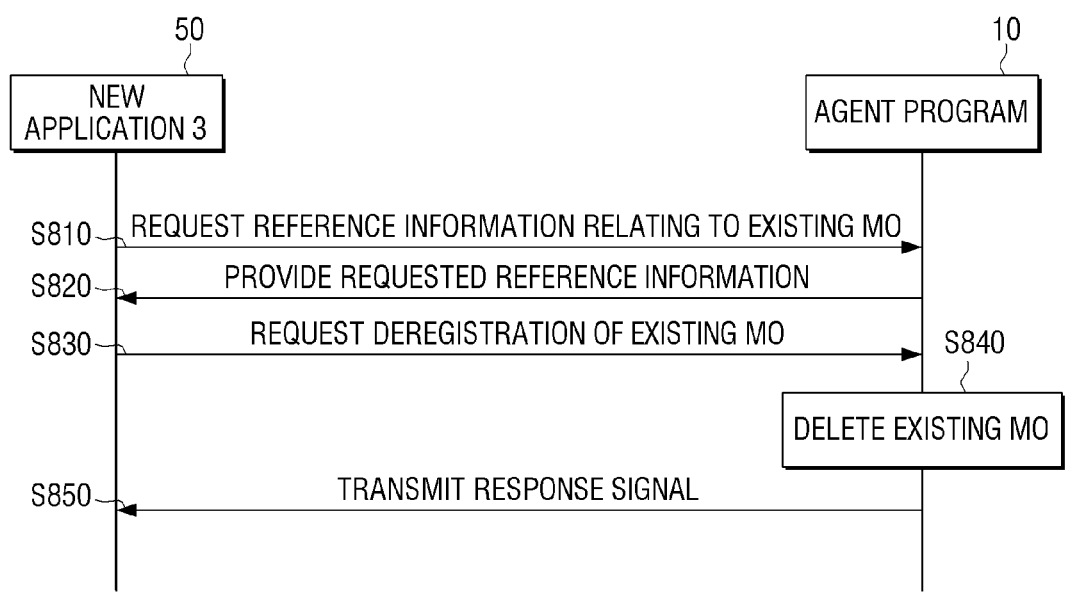
FIG. 8 is a diagram illustrating an example of a deletion process for deleting an MO from an image forming apparatus, according to an embodiment.

FIG. 8 is a diagram illustrating an example of deleting an existing MO, according to an embodiment. Referring to FIG. 8, in operation S810, in response to the installation and execution of new application 3 (50), which is an application for deleting an existing MO, new application 3 (50) may request reference information relating to the existing MO from the agent program 10. In operation S820, the agent program 10 may provide the reference information relating to the existing MO to new application 3 (50). In operation S830, new application 3 (50) may request the agent program 10 to deregister the existing MO. In operation S840, the agent program 10 may deregister the existing MO by deleting information relating to the existing MO from an MIB. In operation S850, the agent program 10 may transmit a response signal indicating whether the existing MO has been successfully deregistered to new application 3 (50).

Once the existing MO is deregistered from the MIB, no information relating to the existing MO may be provided to the host device 100 even when requested.

The operations of application 1 (30), application 2 (40), and new application 3 (50) may be executed by the application control module 123, and the operation of the agent program 10 may be executed by the agent execution module 124.

Not only the MO managed by an embedded application but also the MO managed by application 1 (30) may be subject to the above-mentioned MO modification or deletion operation.

In a case in which a new application having a new MO having the same OID as an existing MO in the MIB is installed and executed, the application control module 123 may request the agent execution module 124 to deregister the existing MO from the MIB and register the new MO in the MIB. Alternatively, the application control module 123 may store the new MO in the storage unit 130, and may selectively provide the new MO or the existing MO in accordance with the policy of the image forming apparatus 100.

In the examples illustrated in FIGS. 3 and 4, the image forming apparatus 100 may use an application present in the storage unit 130 of the image forming apparatus 100. In another non-limiting example, the image forming apparatus 100 may use an application that is stored in a remote location.

Figure 9:
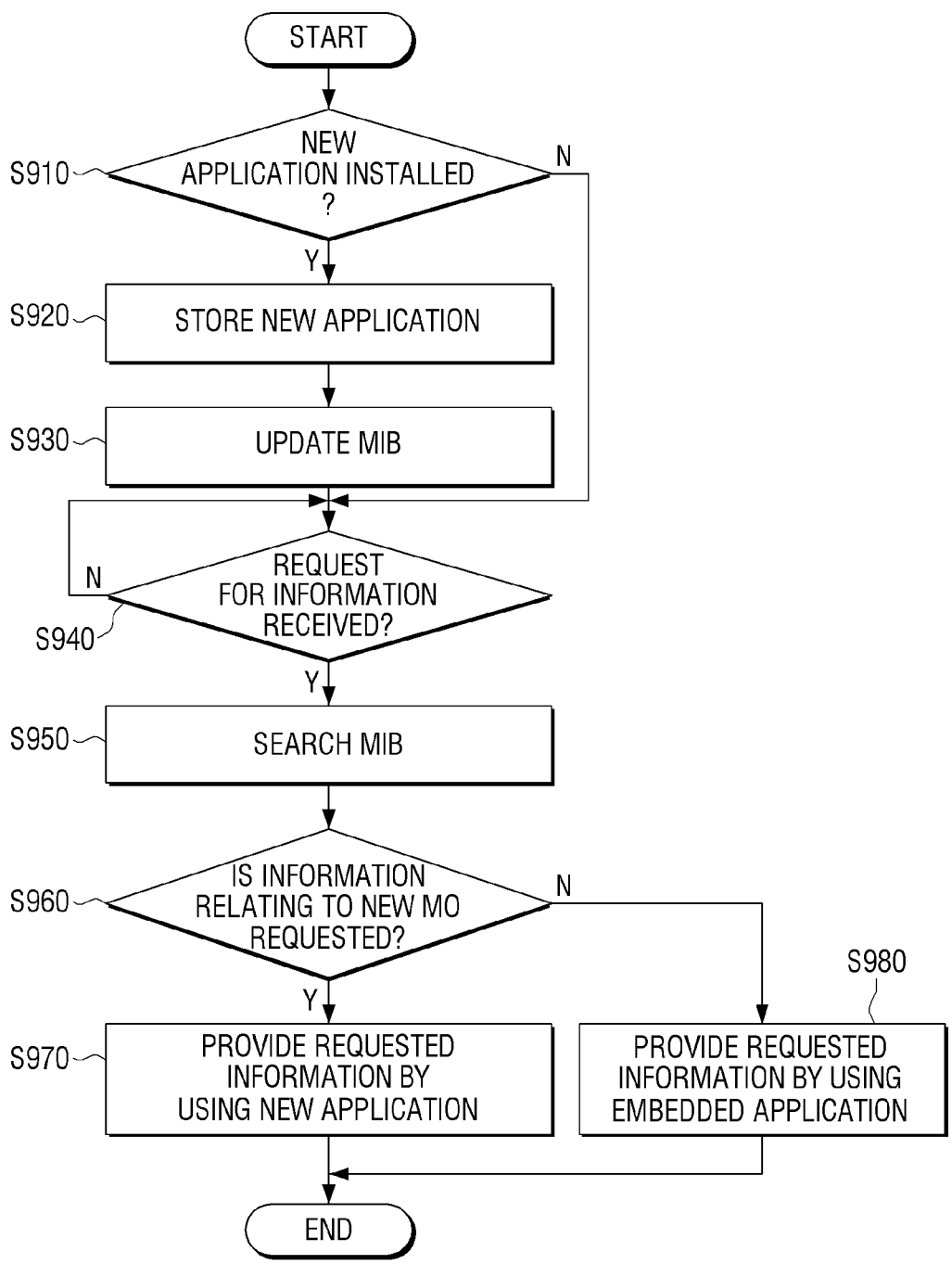
FIG. 9 is a flowchart illustrating an information providing method of an image forming apparatus, according to an embodiment.

FIG. 9 is a flowchart illustrating an image providing method of an image forming apparatus, according to an embodiment. Referring to FIG. 9, in operation S910, a new application may be installed. In operation S920, the new application may be stored and executed. In operation S930, the image forming apparatus updates the MIB using information on a new MO of the new application. In a case in which the new application is for modifying or deleting an existing MO in an MIB, an MO modification operation or an MO deletion operation may be performed. The MO modification operation or the MO deletion operation has already been described above with reference to FIGS. 7 and 8, and thus, detailed descriptions and illustrations thereof will be omitted.

In operation S940, the manager program of a host device may request information. In operation S950, the agent program may search through the MIB. In operation S960, the agent program may determine whether the requested information is information relating to the new MO. In operation S970, in a case in which the requested information is the information relating to the new MO, the requested information may be acquired by using the new application, and the acquired information may be transmitted to the host device. Alternatively, in operation S980, in a case in which the requested information is information relating to the existing MO, the requested information may be acquired by using an embedded application, and the acquired information may be transmitted to the host device.

The information providing method illustrated in FIG. 9 may also include: in response to the installation and execution of a new application for modifying the existing MO, providing reference information relating to the existing MO to the new application; generating a modified MO by modifying the existing MO based on the reference information with the use of the new application; registering the modified MO in the MIB by updating an OID of the existing MO with an OID of the modified MO; and providing information relating to the modified MO to the host device upon the request of the host device by using the new application.

The information providing method illustrated in FIG. 9 may also include: in response to the installation and execution of a new application for deleting the existing MO, deleting the existing MO from the MIB by using the agent program; and in response to the installation and execution of a new application having a new MO having the same OID as the existing MO, deregistering the existing MO from the MIB and registering the new MO in the MIB.

As described above, it is possible to add, modify, or delete an MO by installing a new application according to a user's needs while using the SNMP. Therefore, it is possible to effectively respond to a request for various types of information.

As described above, the host device is connected to and manages a plurality of image forming apparatuses. The host device and the image forming apparatuses may communicate with one another using diverse protocols. Hereinbelow, embodiments of a management system including the host device which manages each of the image forming apparatuses using the SNMP, and communication mechanism within the management system are described in detail.

Figure 10:
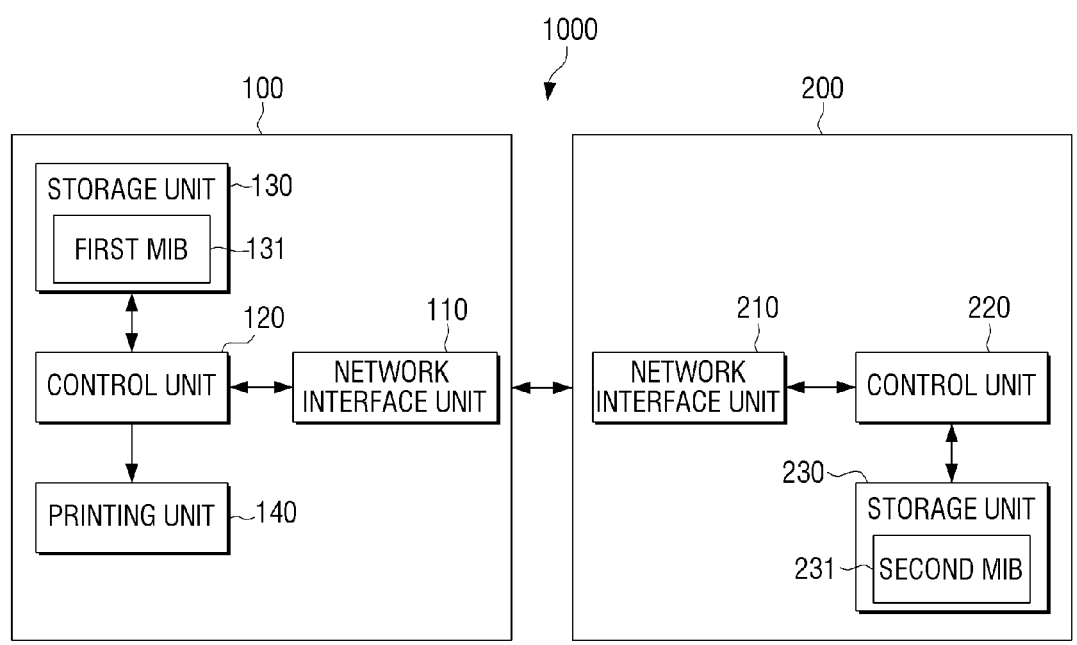
FIG. 10 is a block diagram illustrating a detailed composition of a management system.

Referring to FIG. 10, a management system 1000 may include an image forming apparatus 100 and a host device 200. For convenience of explanation, only a single image forming apparatus 100 is illustrated in FIG. 10, but a plurality of image forming apparatuses may be provided.

The image forming apparatus 100 may include a network interface unit 110, a control unit 120, a storage unit 130, and a printing unit 140. Detailed description of operation of these elements has been provided with reference to FIG. 3, and is thus not repeated here.

The storage unit 130 stores diverse information on the image forming apparatus 100, an agent program, diverse applications, a first MIB 131, and so forth.

The control unit 120 executes diverse programs stored in the storage unit 1 and communicates with the host device 200 using the SNMP. Specifically, if an application is newly installed, the control unit 120 updates a first MIB 131 using an OID of a MO which the installed application. Subsequently, if an information request is received from the host device 200, the control unit 120 provides information using the updated first MIB 131. The control unit 120 identifies an OID which is designated in the information request, from the updated first MIB. The control unit 120 executes an application corresponding to the identified OID and transmits information corresponding to the designated OID to the host device 200. This operation of the control unit 120 may be performed by executing the agent program stored in the storage unit 130.

The host device 200 may include a network interface unit 210, a control unit 220, and a storage unit 230.

The network interface unit 210 is an element to communicate with diverse external devices including the image forming apparatus 100 through a network.

The storage unit 230 stores diverse programs and data to operate the host device 200. In particular, the storage unit 230 may include a second MIB. The second MIB may be managed by a manager program of the host device 200 which recognizes and manages the image forming apparatus 100.

The control unit 220 transmits a request for information to the image forming apparatus 100 through the network interface unit 210, receives the information, and provides the user with the information.

That is, the user may execute the manager program through diverse types of input provided in the host device 200, such as a mouse or a keyboard. If the manager program is executed, the control unit 220 may display a management screen through a display (not illustrated) provided in the host device 200. The user may select a menu to identify information on the management screen. If the menu is selected, the control unit 220 executes the manager program and transmits a request for information to the agent program of the image forming apparatus 100.

If an application is newly installed as described above with reference to the image forming apparatus 100, the control unit 220 may update the second MIB 231 using an OID of a MO which the newly installed application has. The updating of the second MIB 231 may be manually performed on the management screen. Specifically, the user connects the image forming apparatus 100 to a storage medium such as a USB memory stick, installs an application in the image forming apparatus 100, and inputs an OID list for MOs managed by the application to the host device 200, so that the second MIB 231 may be updated. Alternatively, the control unit 220 of the host device 200 may receive information about a newly installed application and MOs managed by the application from the image forming apparatus 100, and automatically update the second MIB 231 based on the received information. These operations may be performed by executing the manager program installed in the host device 200.

If the second MIB 231 is updated, the control unit 220 of the host device 200 may constitute the management screen based on the updated second MIB 231. Specifically, if there is a newly added MO, a menu for the new MO is additionally displayed, and if an existing MO is changed or deleted, a menu may be changed or deleted accordingly.

The image forming apparatus 100 and the host device 200 may communicate with each other using the SNMP as described above.

Figure 11:
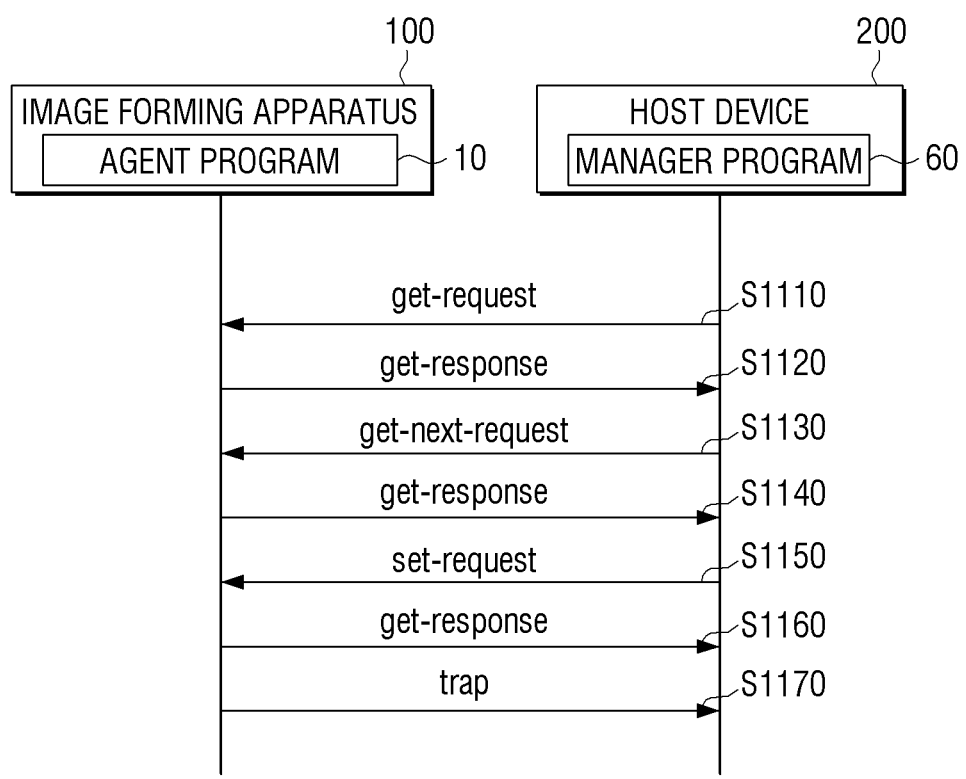
FIG. 11 is a view specifically illustrating a communication method among apparatuses in the management system of FIG. 10.

FIG. 11 is a view specifically illustrating a communication method among apparatuses in the management system using the SNMP.

As illustrated in FIG. 11, an agent program 10 is installed in the image forming apparatus 100, and a manager program 60 is installed in the host device 200. The image forming apparatus 100 and the host device 200 perform SNMP communication by executing the agent program 10 and the manager program 60.

Specifically, in operation S1110, if a predetermined menu is selected on the management screen of the host device 200, the manager program 60 transmits a get-request PDU (Protocol Data Unit) to the agent program 10 in order to read a value of a MO corresponding to the selected menu. In operation S1130, the manager program 60 transmits a get-next-request PDU to the agent program 10 in order to bring a value of a next object of the designated object or a value of a next index if the designated object is a table. In operations S1120 and S1140, in response to a receipt of the get-request PDU or the get-next-request PDU from the manager program 60, the agent program 10 transmits a get-response PDU including the value of the corresponding MO to the manager program 60.

Alternatively, in operation S1150, the manager program 60 may transmit a set-request PDU to the agent program 10 in order to change a value of a MO of the agent program 10. In operation S1160, in response to the set-request PDU, the agent program 10 may transmit a get-response PDU to the manager program 60.

In operation S1170, if a predetermined situation occurs, the agent program 10 may notify the manager program 60 of occurrence of the situation using a trap PDU.

The manager program 60 may display diverse information on the management screen using each PDU transmitted from the agent program 10.

FIGS. 12A-12E are views illustrating a format of an SNMP message.

FIG. 12A illustrates a basic format of an SNMP message. An SNMP message consists of a Version, a Community, and a SNMP PDU. The Version indicates the number of an SNMP version. For example, in a case of SNMPv1, 0 is written for the Version. The Community indicates a password between the manager program 60 and the agent program 10. PDU may contain diverse SNMP messages as illustrated in FIGS. 12B through 12D of FIG. 12. FIG. 12B illustrates a format of a Get-request, a Get-Next-Request, or a Set-Request PDU. With reference to FIG. 12B, PDU contains a PDU type, a Request ID, and Variable bindings. The PDU type indicates what the PDU is. For example, if a PDU type is 0, the PDU type indicates a Get-request, if a PDU type is 1, the PDU type indicates a Get-Next-request, if a PDU type is 2, the PDU type indicates a Set-request PDU, if a PDU type is 3, the PDU type indicates a Get-response, and if a PDU type is 4, the PDU type indicates a trap. The Request ID indicates an ID of an SNMP request packet. The Variable bindings indicate an OID which is information that the user of the host device, that is, the manager wishes to obtain. FIG. 12E illustrates the structure of Variable bindings. As illustrated in FIG. 12E, the Variable bindings may include a set of names of a plurality of OID and their values. FIG. 12C illustrates a format of a Get-response PDU. In the format, the Error status indicates an integer value which the agent program 10 enters to inform an error status. The Error index indicates that an error occurs in the umteenth OID of the variable bindings. FIG. 12D illustrates a format of a Trap PDU. The Trap PDU is a PDU which the agent program 10 transmits to the manager program 60. The Trap PDU includes diverse information to inform the state of the agent program 10, but detailed description thereof is omitted here.

The manager program 60 collects diverse information on the image forming apparatus 100 in the SNMP method described with reference to FIGS. 11-12E, and provides the user, i.e. the manager, with the information through the management screen. In response to a request from the manager program 60, the agent program 10 transmits an MO and its value to the manager program 60 using an existing embedded application or a newly installed application.

As described above, the agent program 10 generates and manages an MIB in order to provide an MO requested by the manager program 60.

The MIB includes diverse information on MOs. The MIB is constituted in a tree structure. In general, a standard MIB defined by Request For Comments (RFC) is referred to as a public MIB, and a MIB defined by necessity of each vendor is referred to as a private MIB.

For example, a printer MIB defined by RFC-3805 defines an MO of prtMarkerSuppliesLevel. An OID of prtMarkerSuppliesLevel is 1.3.6.1.2.1.43.11.1.1.9, and this MO has current level values of expendable supplies. Accordingly, an image forming apparatus implementing the printer MIB may support the prtMarkerSuppliesLevel MO. If there is a host device which wishes to monitor an expendable supply of such an image forming apparatus, the host device may transmit a request for a value of the prtMarkerSuppliesLevel MO to an agent program of the image forming apparatus using the SNMP, and may receive and identify a result value.

Figure 13:
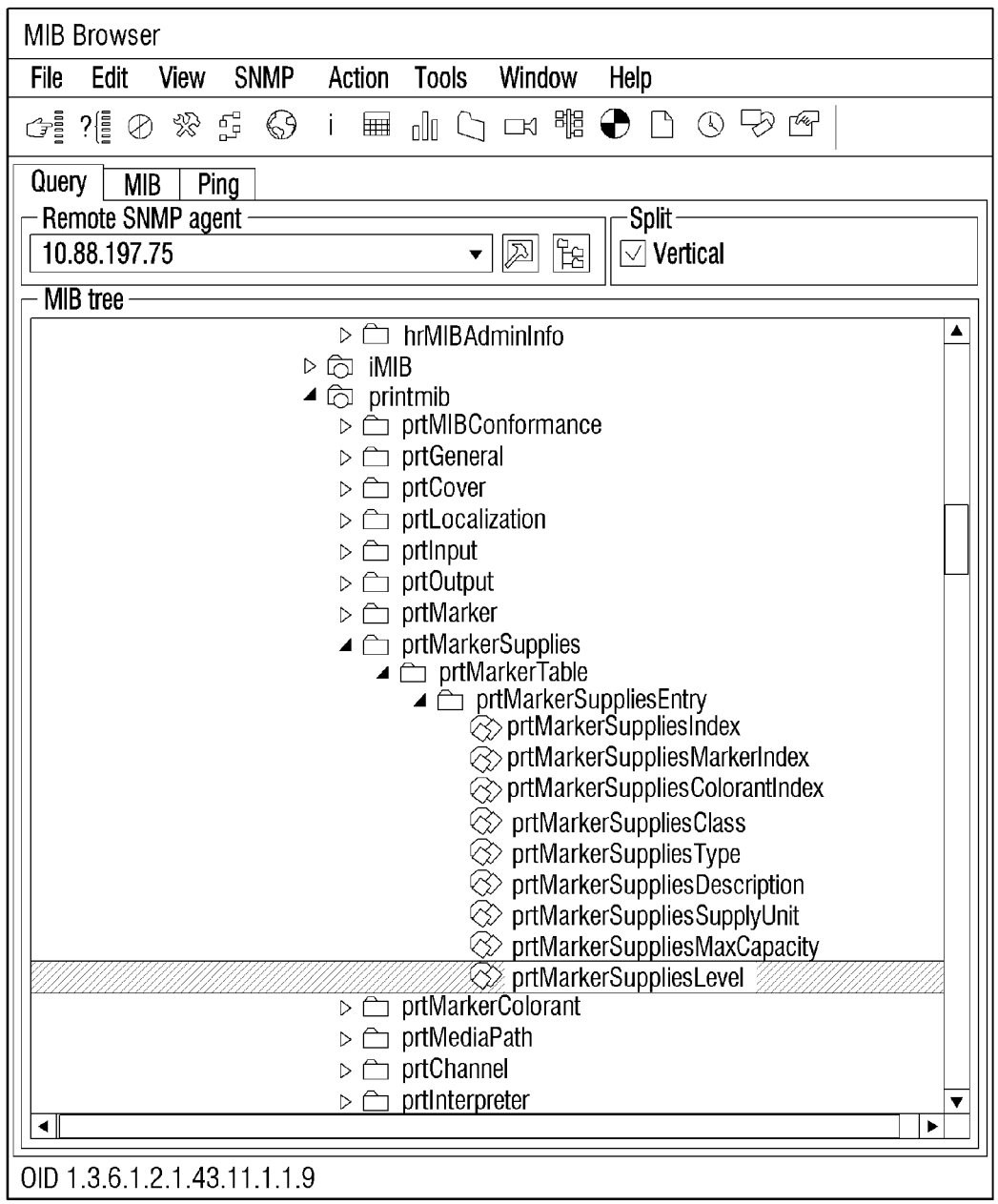

For example, a tree of the printer MIB may be displayed on an MIB browser as illustrated in FIG. 13.

With reference to FIG. 13, the printer MIB may include diverse MOs such as prtMarkerSuppliesIndex, prtMarkerSuppliesMarkerindex, prtMarkerSuppliesColorantIndex, prtMarkerSuppliesClass, prtMarkerSuppliesType, prtMarkerSuppliesDescription, prtMarkerSuppliesSupplyUnit, and prtMarkerSuppliesMaxCapacity, as well as prtMarkerSuppliesLevel.

Among these MOs, the prtMarkerSuppliesLevel MO may be defined as illustrated in FIG. 14.

With reference to FIG. 14, an OID of the prtMarkerSuppliesLevel MO is 1.3.6.1.2.1.43.11.1.1.9, indicating an MO to provide a manager program with a current level value of an expendable supply. Other MOs may be identified through the MIB browser, but illustration and description thereof is omitted here. Each MO recorded in the MIB may be obtained according to an SNMP Get command or may be modified according to an SNMP Set command.

The above-mentioned embodiments have been described taking an image forming apparatus as an example. However, there is no restriction to the type of device to which the present inventive step can be applied. That is, the present inventive step can be applied to nearly all types of devices that provide device information by using the SNMP and have an open platform architecture.

In the above-mentioned embodiments, a new application is installed in an image forming apparatus in which an embedded application has been already installed, but this is merely an example. An image forming apparatus which does not include an embedded application may be manufactured according to model or performance.

Whenever a new application is installed, the agent program 10 updates the MIB using information on the new application and information on a MO of the new application.

Figure 15:
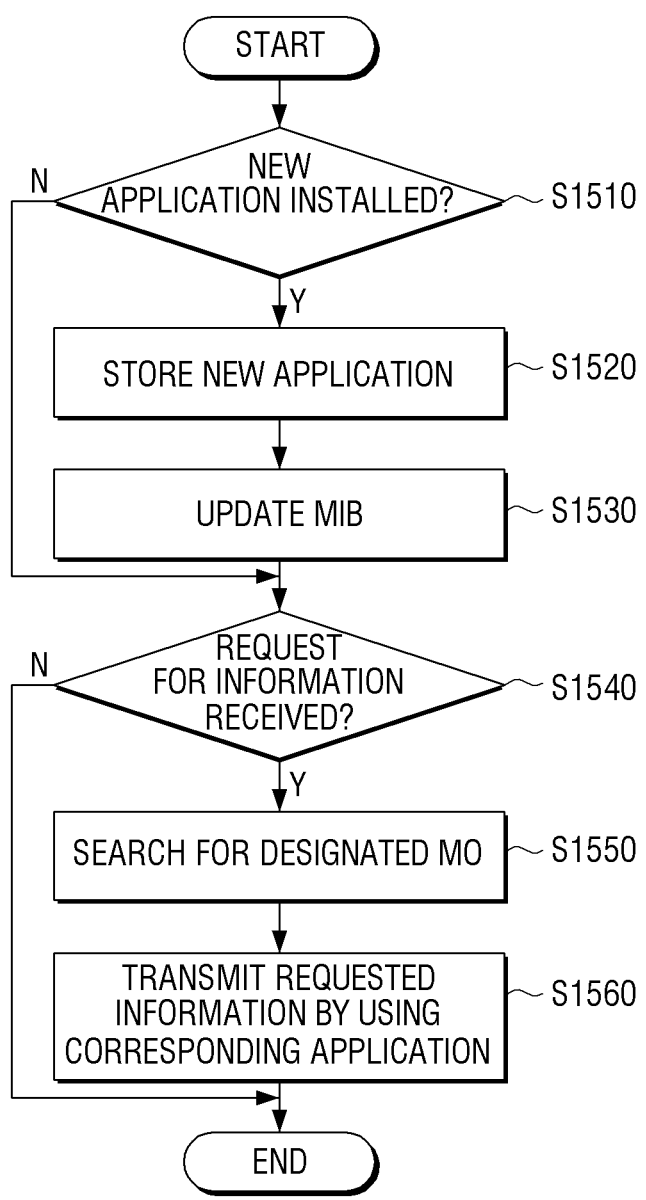
FIG. 15 is a flowchart illustrating an information provision method of an image forming apparatus according to another exemplary embodiment.

FIG. 15 is a flowchart illustrating an information provision method of an image forming apparatus which does not include an embedded application according to another exemplary embodiment.

As illustrated in FIG. 15, in operation S1510, an application is newly installed in the image forming apparatus. In operation S1520, the image forming apparatus stores the new application. In operation S1530, the image forming apparatus updates an MIB using an OID of an MO included in the new application.

In operation S1540, the image forming apparatus receives a request for information from a host device. In operation S1550, the image forming apparatus searches the MIB for an MO designated by the information request. Subsequently, in operation S1560, the image forming apparatus provides the host device with information corresponding to the designated MO using an application corresponding to the searched MO. Receipt of the information request and response thereto may be performed as described above using the SNMP.

Operation S1530 of updating the MIB may be implemented in diverse methods according to characteristics of the installed application. For example, if a newly installed application has a new MO which is not included in the existing applications, the image forming apparatus may update the MIB by adding an OID of the new MO to the MIB.

Alternatively, if a newly installed application has a changed MO to change an existing MO, the image forming apparatus may update the MIB by changing an OID of the existing MO recorded in the MIB into an OID of the changed MO.

Alternatively, if a newly installed application has an application to delete an existing MO, the image forming apparatus may update the MIB by deleting an OID of the existing MO from the MIB. As described above, the MIB may be updated by freely installing an application so that it is possible to implement a system without an embedded application.

The programs to perform the methods introduced in the above-mentioned embodiments may be stored in one or more non-transitory computer-readable media.

The non-transitory computer-readable media are not media that store data for a short period of time such as registers, cashes, memories, etc, but that store data semi-permanently and are readable by devices. Specifically, diverse applications or programs as described above may be stored and provided in non-transitory computer-readable media such as compact disks (CDs), digital versatile disks (DVDs), hard disks, Blu-ray disks, USBs, memory cards, read-only memories (ROMs), etc.

The foregoing embodiments and advantages are merely exemplary and are not to be construed as limiting. The present teaching can be readily applied to other types of apparatuses. Also, the description of embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image forming apparatus comprising:
a network interface unit which is configured to be connected to a host device in which a manager program is stored;
a printing unit which performs a printing job;
a storage unit which stores information on the image forming apparatus and an agent program which provides information to the manager program; and
a control unit which communicates with the host device using a Simple Network Management Protocol (SNMP),
wherein if an application, which includes information corresponding to a management object (MO), is newly installed, the control unit updates information on an object identifier (01D) registered in the agent program by using an OID of the MO corresponding to the information included in the newly installed application, and
wherein if a request for information designating an OID included in the updated information is input from the host device, the control unit transmits information corresponding to the designated OID to the host device by executing an application corresponding to the designated OID using the agent program.

2. The image forming apparatus according to claim 1, wherein if the newly installed application includes information on a new MO, the control unit adds an OID of the new MO to the information on an OID registered in the agent program.

3. The image forming apparatus according to claim 1, wherein if the newly installed application includes information on a changed MO which changes an existing MO, the control unit changes an OID of the existing MO included in the information on an OID registered in the agent program to an OID of the changed MO.

4. The image forming apparatus according to claim 1, wherein if the newly installed application includes information on an existing MO which is to be deleted, the control unit deletes the existing MO from the information on an OID registered in the agent program.

5. The image forming apparatus according to claim 1, wherein the storage unit stores an embedded application including information on at least one MO and the newly installed application, and
wherein if the OID designated by the information request transmitted from the host device is an OID of the MO of the embedded application, the control unit provides the host device with information by executing the embedded application, or if the designated OID is an OID of an MO of the newly installed application, the control unit provides the host device with information by executing the newly installed application.

6. The image forming apparatus according to claim 5, further comprising:
an interface unit which is connected to an external source in which an application to be newly installed, which has information on a MO, is stored; and
a user interface (UI) unit which receives a request to install an application,
wherein if the external source is connected to the interface unit and if the request to install the application is input, the control unit installs and stores the application stored in the external source in the storage unit.

7. The image forming apparatus according to claim 6, wherein the control unit comprises:
an agent execution module which executes the agent program;
an application registration module which verifies the application stored in the external source if the request to install the application is input;
an application storage module which installs and stores the application in the storage unit if the verification is completed; and
an application control module which executes the application newly installed in the storage unit and registers an OID of an MO corresponding to the information included in the newly installed application, in the agent program.

8. A management system comprising:
a host device which stores a manager program; and
an image forming apparatus which stores an agent program corresponding to the manager program,
wherein the image forming apparatus comprises:
a network interface unit which is connected to a host device;
a printing unit which performs a printing job;
a storage unit which stores information on the image forming apparatus and the agent program; and
a control unit which communicates with the host device using a Simple Network Management Protocol (SNMP),
wherein if an application, which includes information corresponding to a management object (MO), is newly installed, the control unit updates information on an object identifier (OID) registered in the agent program by using an object identifier (OID) of the MO corresponding to the information included in the newly installed application,
wherein if a request for information designating an OID included in the updated information is input from the host device, the control unit transmits information corresponding to the designated OID to the host device by executing an application corresponding to the designated OID using the agent program, and
wherein the host device has a management information base (MIB), transmits a request for information to the image forming apparatus using the MIB, and receives the information corresponding to the request for information, and
wherein if the application which includes information on a management object (MO) is newly installed in the image forming apparatus, the host device updates the MIB using an OID of an MO corresponding to the information included in the newly installed application.

9. The management system according to claim 8, wherein if the application newly installed in the image forming apparatus includes information on a new MO, the control unit adds an OID of the new MO to the information on an OID registered in the agent program, and
wherein the host device adds the OID of the new MO and the information on the image forming apparatus to the MIB.

10. The management system according to claim 8, wherein if the application newly installed in the image forming apparatus includes information on a changed MO which changes an existing MO, the control unit changes an OID of the existing MO included in the information on an OID registered in the agent program to an OID of the changed MO.

11. The management system according to claim 8, wherein if the application newly installed in the image forming apparatus includes information on an existing MO to be deleted, the control unit deletes an existing MO from the information on an OID registered in the agent program.

12. The management system according to claim 8, wherein the storage unit stores an embedded application including information on at least one MO and the newly installed application, and
   wherein if the OID designated by the information request transmitted from the host device is an OID of the MO of the embedded application, the control unit provides the host device with information by executing the embedded application, or if the designated OID is an OID of an MO of the newly installed application, the control unit provides the host device with information by executing the newly installed application.

13. The management system according to claim 12, wherein the image forming apparatus further comprises:
   an interface unit which is connected to an external source in which an application to be newly installed, which has information on a MO, is stored; and
   a user interface (UI) unit which receives a request to install an application, and
   wherein if the external source is connected to the image forming apparatus and if the request to install the application is input, the control unit installs and stores the application stored in the external source, in the storage unit.

14. An information providing method of an image forming apparatus, the method comprising:
   if an application, which includes information corresponding to a management object (MO), is newly installed in the image forming apparatus, storing, by the image forming apparatus, the application in at least one storage unit of the image forming apparatus;
   updating, by the image forming apparatus, information on an object identifier (OID) registered in an agent program in the at least one storage unit by using an OID of the MO corresponding to the information included in the newly installed application;
   receiving, by the image forming apparatus, a request for information designating an OID from a host device in which a manager program corresponding to the agent program is installed, using a Simple Network Management Protocol (SNMP); and
   providing, by the image forming apparatus, the host device with information corresponding to the designated OID by executing an application corresponding to the designated OID using the agent program.

15. The method according to claim 14, wherein in the updating of the information on an OID registered in the agent program,
   if the newly installed application includes information on a new MO, an OID of the new MO is added to the information on an OID registered in the agent program,
   if the newly installed application includes information on a changed MO which changes an existing MO, an OID of the existing MO included in the information on an OID registered in the agent program is changed to an OID of the changed MO, and
   if the newly installed application includes information on an existing MO to be deleted, the OID of the existing MO is deleted from the information on the OID registered in the agent program.

16. The image forming apparatus according to claim 1, wherein the storage unit stores a management information base (MIB) including at least one MO, and the control unit updates an MO included in the MIB based on the information on the MO included in the newly installed application.

17. The image forming apparatus according to claim 16, wherein if the newly installed application includes information on a new MO, the control unit adds the new MO to the MIB.

18. The image forming apparatus according to claim 16, wherein if the newly installed application includes information on a changed MO which changes an existing MO, the control unit changes the existing MO included in the MIB to the changed MO.

19. The image forming apparatus according to claim 16, wherein if the newly installed application includes information on an existing MO which is to be deleted, the control unit deletes the existing MO included in the MIB.

20. An image forming apparatus comprising:
   a network interface unit which is connected to a host device in which a manager program is stored;
   a printing unit which performs a printing job;
   a storage unit which stores information on the image forming apparatus, a management information base (MIB), and an agent program which provides information to the manager program; and
   a control unit which communicates with the host device using a Simple Network Management Protocol (SNMP),
   wherein if an application, which includes information corresponding to a management object (MO), is newly installed, the control unit updates the MIB based on the information corresponding to the MO included in the newly installed application, and
   wherein if a request for information designating an OID of the MO corresponding to the information included in the newly installed application is input from the host device, the control unit transmits information corresponding to the designated OID to the host device by executing the newly installed application using the agent program.

21. An information providing method of an image forming apparatus, the method comprising:
   if an application, which includes information corresponding to a management object (MO), is newly installed in the image forming apparatus, storing, by the image forming apparatus, the application in at least one storage unit of the image forming apparatus;
   updating, by the image forming apparatus, a management information base (MIB) based on the information corresponding to the MO included in the newly installed application;
   receiving, by the image forming apparatus, a request for information designating an OID of the MO corresponding to the information included in the newly installed application from a host device in which a manager program corresponding to an agent program stored in the at least one storage unit is installed, using a Simple Network Management Protocol (SNMP); and
   providing, by the image forming apparatus, the host device with information corresponding to the designated OID by executing the newly installed application.

* * * * *